United States Patent
Hsu et al.

(10) Patent No.: US 8,192,091 B2
(45) Date of Patent: Jun. 5, 2012

(54) OPTICAL FIBER CONNECTOR ADAPTER

(75) Inventors: Min-Chao Hsu, Hsin-Tien (TW);
 Chun-Hsiung Wu, Hsin-Tien (TW);
 Shang-Yi Tung, Hsin-Tien (TW)

(73) Assignee: Advanced Connectek Inc., Hsin-Tien, Taipei Hsien (TW)

( * ) Notice: Subject to any disclaimer, the term of this patent is extended or adjusted under 35 U.S.C. 154(b) by 550 days.

(21) Appl. No.: 12/489,152

(22) Filed: Jun. 22, 2009

(65) Prior Publication Data

US 2010/0278497 A1  Nov. 4, 2010

(30) Foreign Application Priority Data

May 1, 2009  (TW) ................................ 98207448 U

(51) Int. Cl.
 *G02B 6/00* (2006.01)
 *G02B 6/38* (2006.01)
(52) U.S. Cl. .......................................... 385/55; 385/147
(58) Field of Classification Search ................... 385/55, 385/56, 88, 89, 147
 See application file for complete search history.

(56) References Cited

U.S. PATENT DOCUMENTS

| | | | |
|---|---|---|---|
| 5,317,663 A * | 5/1994 | Beard et al. ..................... | 385/70 |
| 6,206,581 B1 * | 3/2001 | Driscoll et al. .................. | 385/78 |
| 6,293,710 B1 * | 9/2001 | Lampert et al. ................. | 385/78 |
| 6,431,762 B1 * | 8/2002 | Taira et al. ...................... | 385/56 |

* cited by examiner

*Primary Examiner* — Akm Ullah
(74) *Attorney, Agent, or Firm* — patenttm.us

(57) ABSTRACT

An optical fiber connector adapter has a housing, a front sleeve holder, a rear sleeve holder, a sleeve and detachable positioning member. The housing has a cavity, two limiting protrusions and two positioning slots. The cavity and positioning slots are defined in the housing. The limiting protrusions are formed in the cavity. The front and sleeve holders are mounted in the cavity and each has a tube and a mount abutting the limiting protrusions. The sleeve is mounted in the tubes. The detachable positioning member is mounted on the housing and has two stoppers extending respectively the positioning slots to make the mounts clamped between the limiting protrusions and the stoppers. The optical fiber connector adapter with the detachable positioning member may be detached easily to facilitate rework.

14 Claims, 8 Drawing Sheets

OPTICAL FIBER CONNECTOR ADAPTER

BACKGROUND OF THE INVENTION

1. Field of the Invention

The present invention relates to an adapter, and more particularly to an optical fiber connector adapter that facilitates reworking thereof, prevents an expensive and time-wasting ultrasound welding process when assembled therefore to improve the fabrication and production rate of the optical fiber connector adapter.

2. Description of Related

Optical connector adapters are used to connecting two optical cables together therefore to extend a total length of the optical cables to facilitate arrangements of optical devices.

U.S. Pat. No. 6,431,762 discloses an optical connector adapter having a sleeve holder, a housing, a sleeve and an engagement pin.

The sleeve holder has a first cylinder, claws and a flange. The housing is hollow and has a cavity, an insertion groove, a flange and a second cylinder. The cavity accommodates and holds the sleeve holder. The insertion groove is defined in the housing. The flange is formed transversely in the cavity and abuts the flange of the sleeve holder. The second cylinder protrudes longitudinally from the flange. The second cylinder combines with the first cylinder. The sleeve is mounted and held in the first and second cylinders. The engagement pin is U-shaped, is mounted in the insertion groove and has two opposite arms. The arms extend in the insertion groove and hold flange of the sleeve holder in the cavity of the housing.

However, the optical connector adapter has following disadvantages.

1. The housing having the flange and second cylinder in the cavity is structurally complicated so that manufacturing the housing by insert molding processes is difficult. Therefore, the optical connector adapter has an undesirable low production rate and a high manufacturing cost.

2. The U-shaped engagement pin is thin and tiny therefore requires precisely and carefully manual or automated alignment so that fabricating the engagement pin is difficult and wastes times. Furthermore, the engagement pin fully inserted in the insertion groove can not be drawn out without specific hand tools. When the sleeve breaks during fabrication or operation of the optical connector adapter, a fabricator or user can not easily dissemble the optical connector adapter to rework. Forcing to dissemble the optical connector adapter damages the housing.

Another optical connector adapter has a front housing, a rear housing, two sleeve holders and a sleeve. Each sleeve holder has a cylinder. When the optical connector adapter is assembled, the sleeve holders combine with each other with the cylinders holding the sleeve. The front and rear housings are welded to each other by an ultrasound welding process and accommodate the sleeve holders and the sleeve. However, the ultrasound welding process requires external power so wastes energy and time and has a high cost. Furthermore, the welded front and rear housings can not be disassembled so that reworking the optical connector adapter is impossible. Moreover, the welded front and rear housings have uneven outer surfaces and deckle edges so that the appearance of the optical connector adapter is undesirable.

To overcome the shortcomings, the present invention provides an optical fiber connector adapter to mitigate or obviate the aforementioned problems.

SUMMARY OF THE INVENTION

The main objective of the invention is to provide an optical fiber connector adapter that facilitates reworking thereof, prevents an expensive and time-wasting ultrasound welding process when assembled therefore to improve the fabrication and production rate of the optical fiber connector adapter.

An optical fiber connector adapter has a housing, a front sleeve holder, a rear sleeve holder, a sleeve and detachable positioning member. The housing has a cavity, two limiting protrusions and two positioning slots. The cavity and positioning slots are defined in the housing. The limiting protrusions are formed in the cavity. The front and sleeve holders are mounted in the cavity and each has a tube and a mount abutting the limiting protrusions. The sleeve is mounted in the tubes. The detachable positioning member is mounted on the housing and has two stoppers extending respectively the positioning slots to make the mounts clamped between the limiting protrusions and the stoppers. The optical fiber connector adapter with the detachable positioning member may be detached easily to facilitate rework.

Other objectives, advantages and novel features of the invention will become more apparent from the following detailed description when taken in conjunction with the accompanying drawings.

DETAILED DESCRIPTION OF THE PREFERRED EMBODIMENT

With reference to FIGS. 1 to 4, an optical fiber connector adapter in accordance with the present invention may accommodate two optical fiber plug connectors and may be compatible with the subscriber connectors (SC) standard to accommodate and hold two SCs.

The optical fiber connector adapter comprises a housing (10), a front sleeve holder (20), a rear sleeve holder (20*a*), a sleeve (30) and a detachable positioning member (50).

Figure 1:
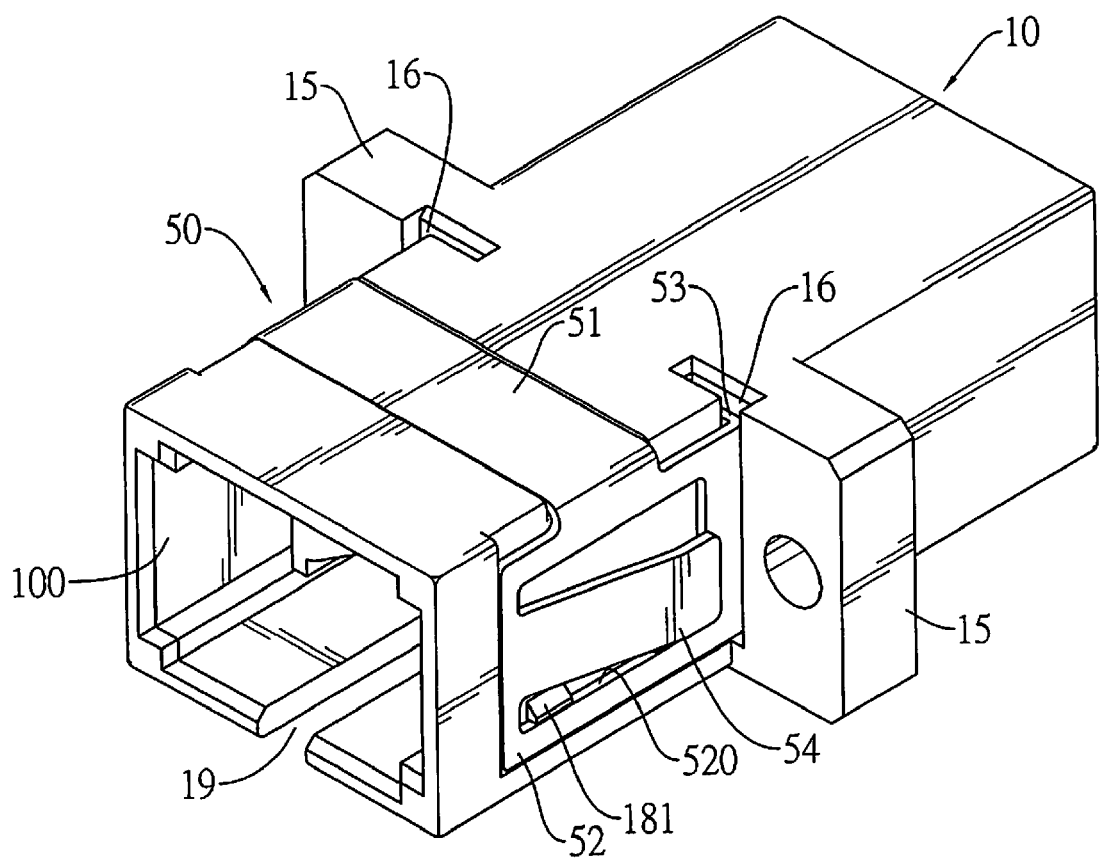
FIG. 1 is a front perspective view of an optical fiber connector adapter in accordance with the present invention.
Figure 2:
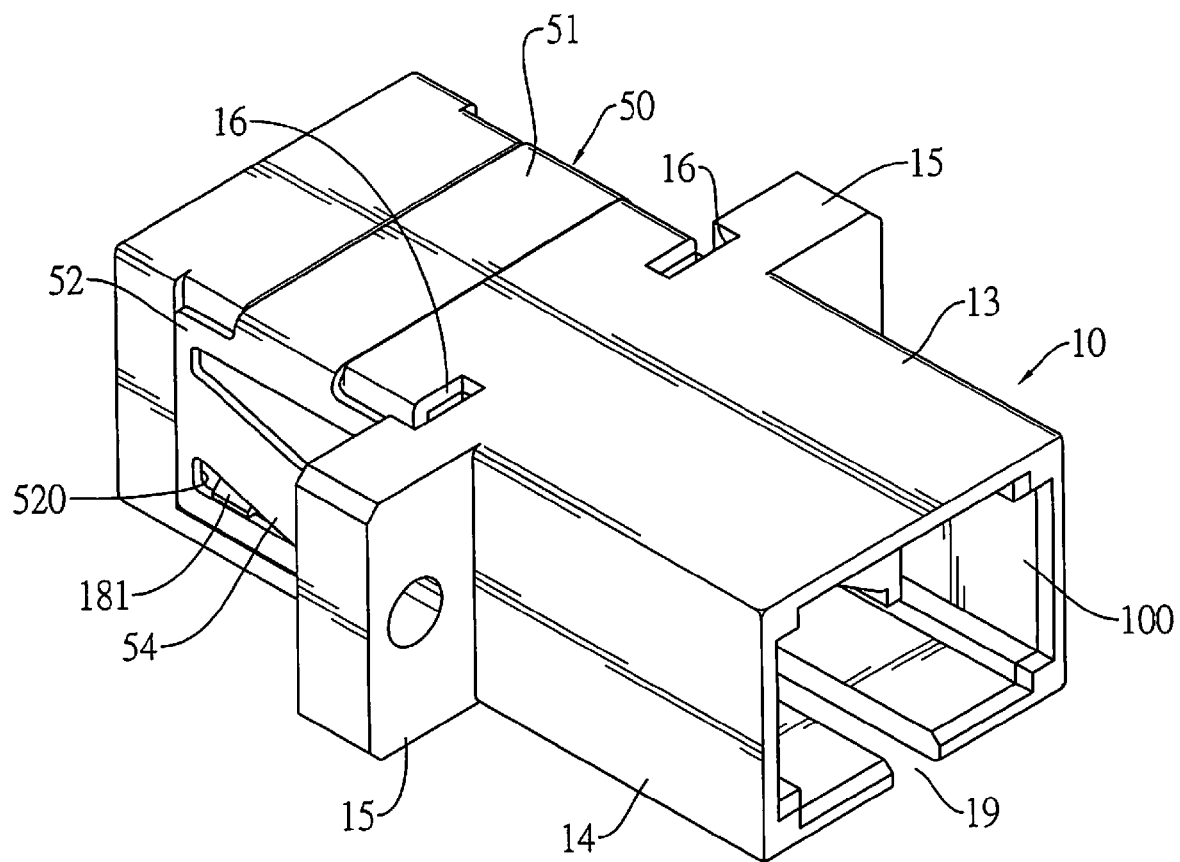
FIG. 2 is a rear perspective view of the optical fiber connector adapter in FIG. 1.
Figure 3:
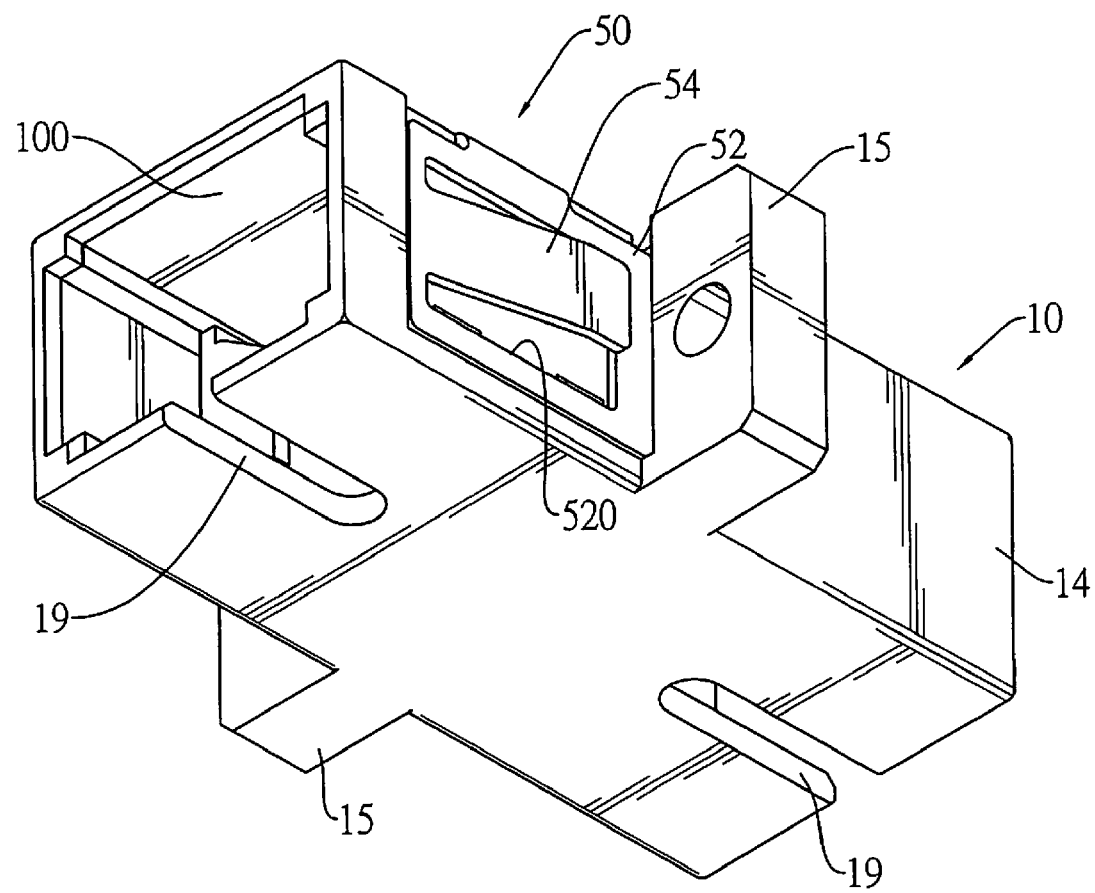
FIG. 3 is a bottom perspective view of the optical fiber connector adapter in FIG. 1.
Figure 4:
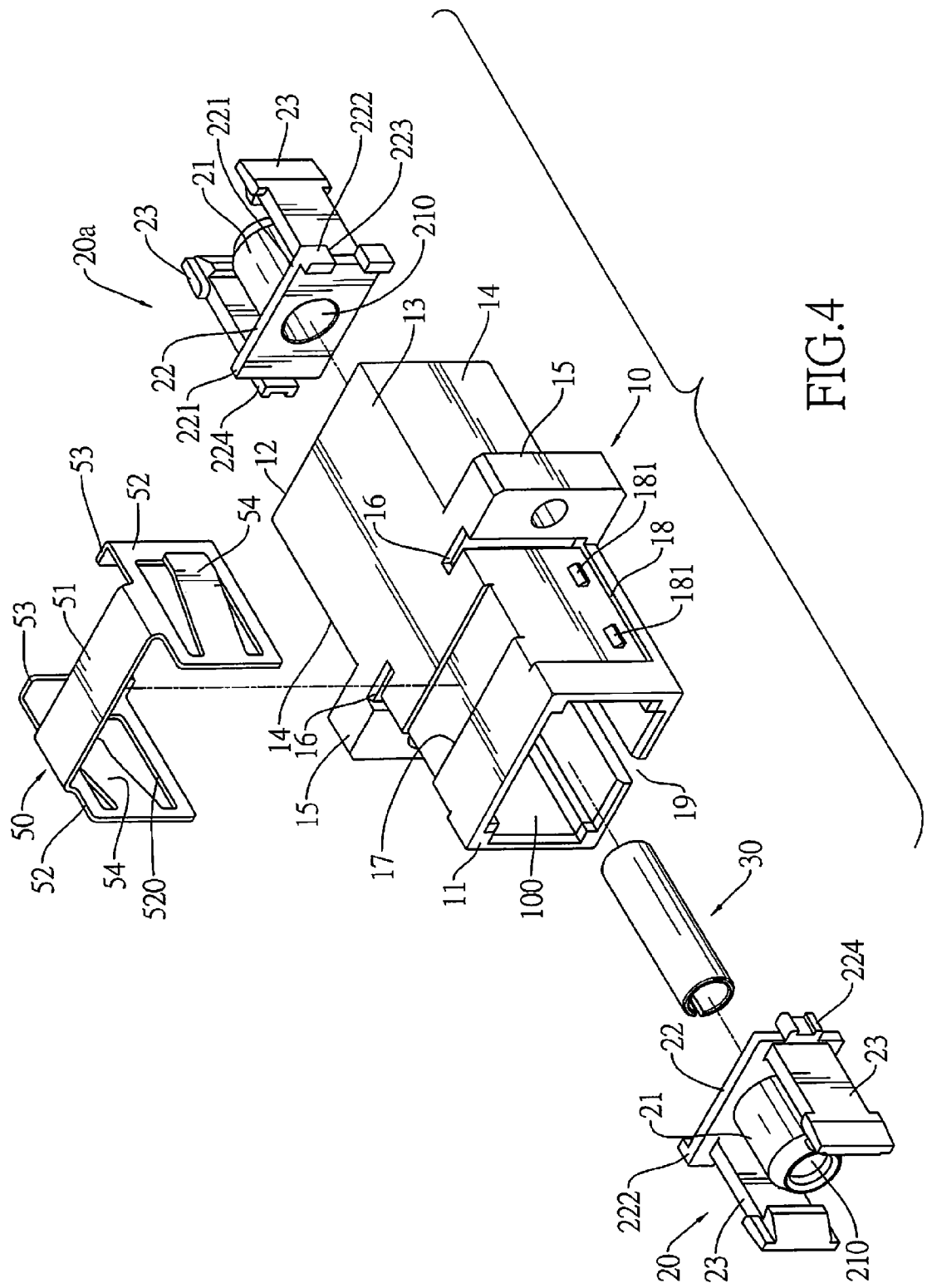
FIG. 4 is an exploded front perspective view of the optical fiber connector adapter in FIG. 1.
Figure 5:
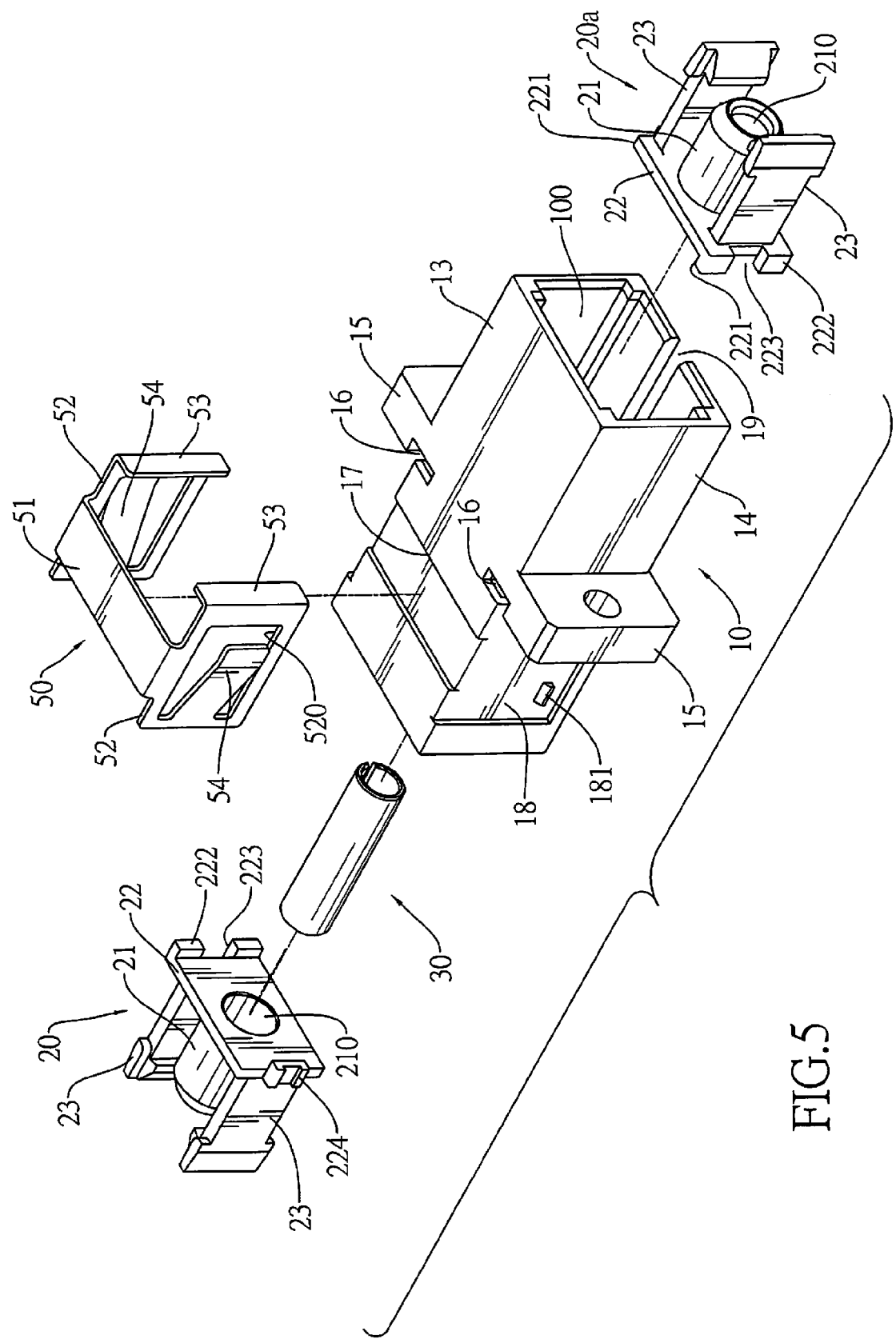
FIG. 5 is an exploded rear perspective view of the optical fiber connector adapter in FIG. 2.
Figure 6:
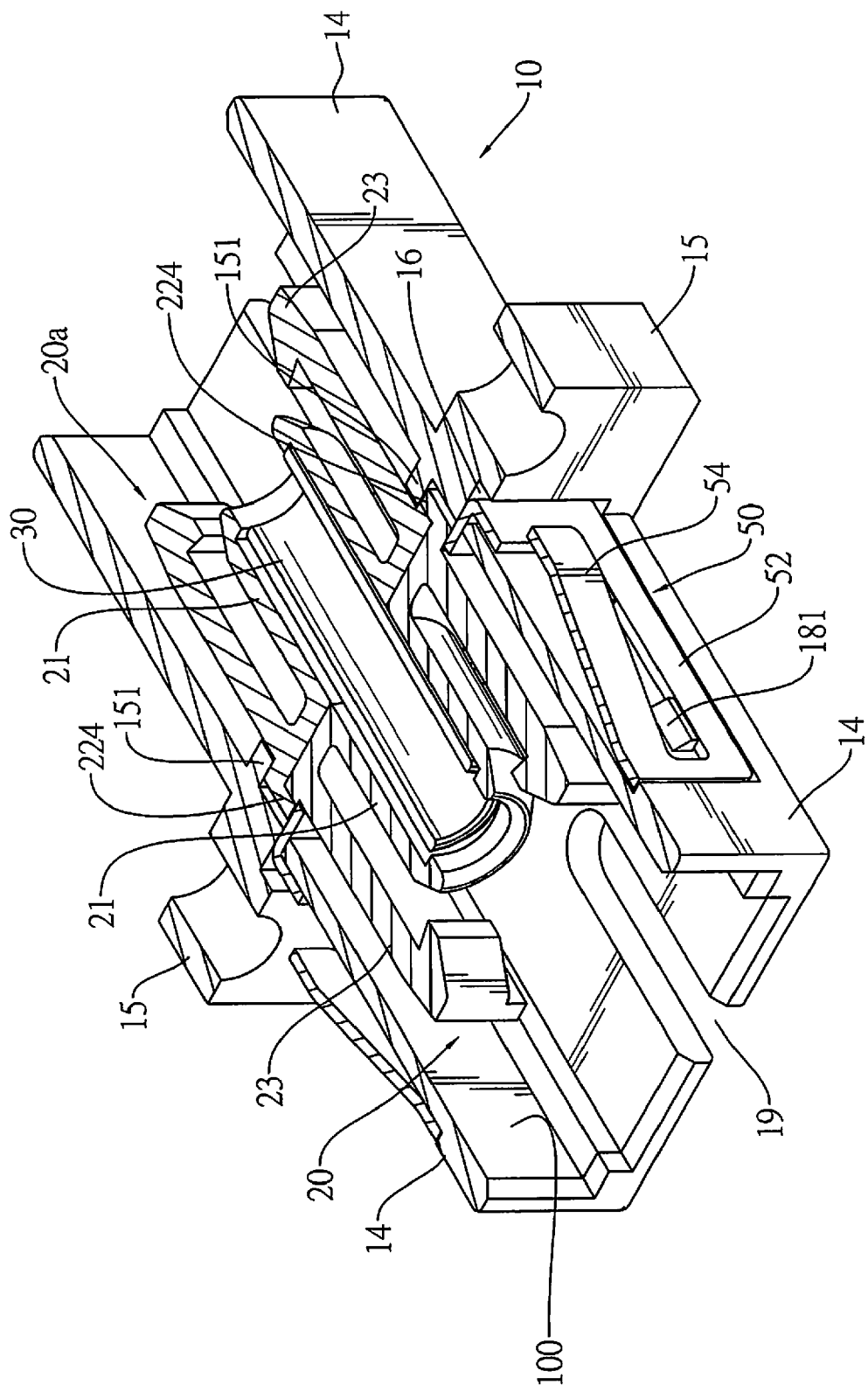
FIG. 6 is a cross sectional perspective view of the optical fiber connector adapter in FIG. 1.
Figure 7:
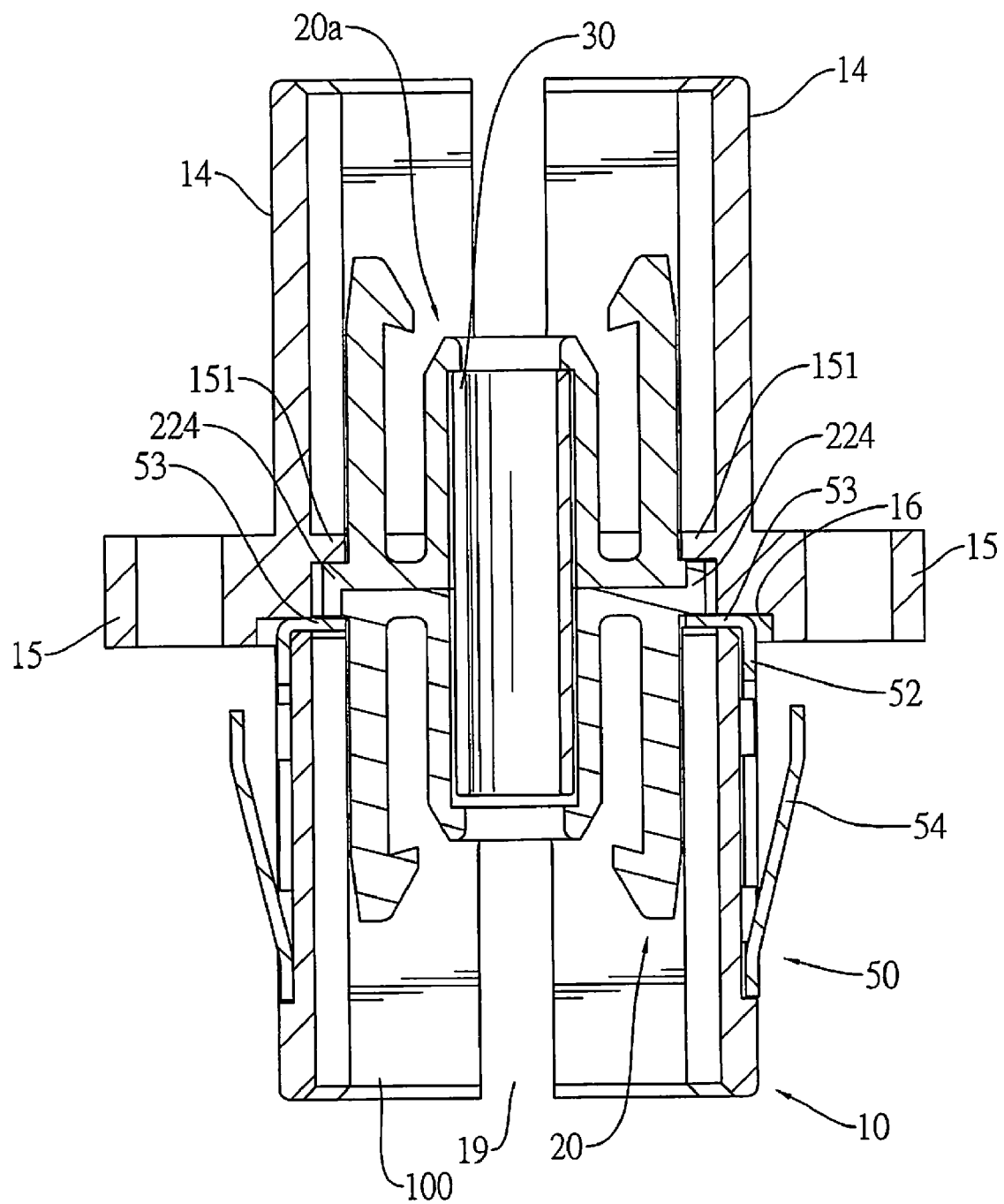
FIG. 7 is a cross sectional top view of the optical fiber connector adapter in FIG. 1.
Figure 8:
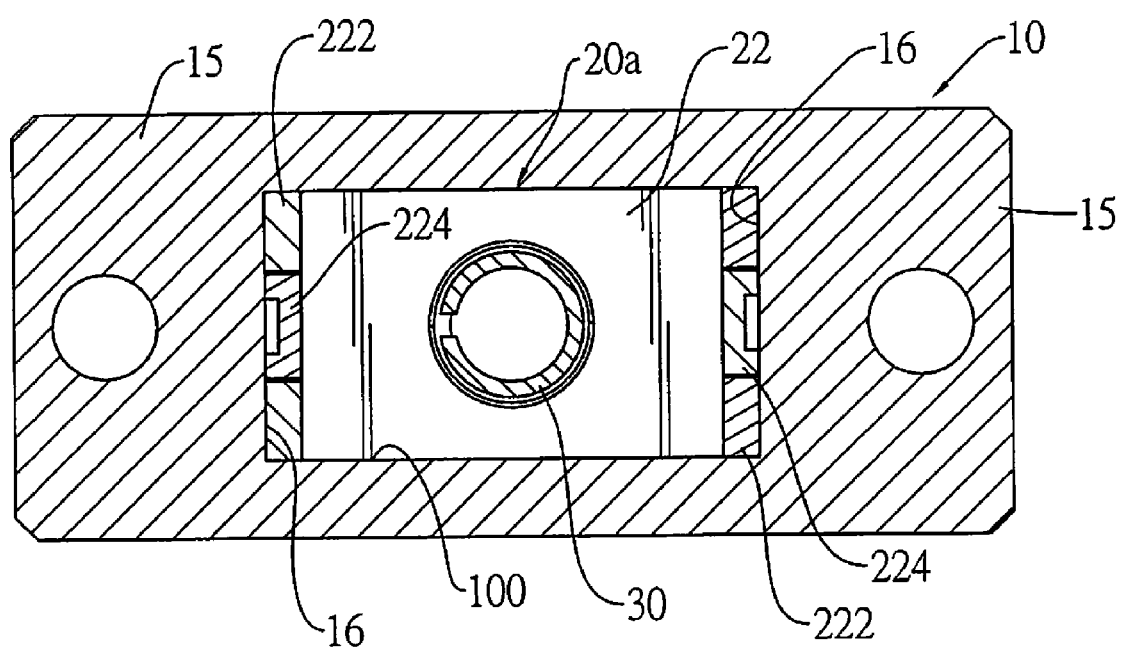
FIG. 8 is a cross sectional end view of the optical fiber connector adapter in FIG. 1.

With further reference to FIGS. 5 to 7, the housing (10) has a front (11), a rear (12), a top (13), a bottom, two opposite sides (14), a cavity (100), two limiting protrusions (151) and two positioning slots (16) and may further have a top indentation (17), two opposite side indentations (18), two opposite protruding blocks (15) and two alignment slits (19).

The cavity (100) is defined in the housing (10) through the front (11) and the rear (12) and has an inner surface.

The limiting protrusions (151) are formed on and protrude transversely from the inner surface of the cavity (100) and may be opposite to each other.

The positioning slots (16) are defined in the top (13) respectively adjacent to the sides (14).

The top indentation (17) is defined in the top (13).

The side indentations (18) are defined respectively in the sides (14) and communicate with the top indentation (17) and each side indentation (18) has an inner surface and at least one hooking element (181) formed on the inner surface.

The protruding blocks (15) are formed respectively on and protrude transversely outwards from the sides (14).

The alignment slits (19) are defined through the bottom respectively adjacent to the front (11) and the rear (12). Each alignment slit (19) may be engaged with an alignment rib on a corresponding optical fiber plug connector for foolproof purposes.

The front sleeve holder (20) is mounted in the cavity (100) of the housing (10) near the front (11) and has a tube (21) and a mount (22).

The tube (21) has an inside end, an outside end and a mounting hole (210) defined axially through the tube (21). The outside end is opposite to the inside end.

The mount (22) is formed on and protrudes radially from the inside end of the tube (21), abuts the limiting protrusions (151) and may have two opposite side edges (221), two opposite resilient hooks (23), a first engaging portion (222) and a second engaging portion (224). The resilient hooks (23) are formed on and protrude longitudinally outwards from the mount (22) and may hook on a corresponding optical fiber plug connector to prevent inadvertent disengagement of the optical fiber connector adapter from the optical fiber plug connector. The first engaging portion (222) is formed on one side edge (221), abuts one limiting protrusion (151) and may have an engaging notch (223) defined in the first engaging portion (222). The second engaging portion (224) is formed on the other side edge (221), abuts the other limiting protrusion (151) and may be an engaging protrusion protruding longitudinally out from the side edge (221).

The rear sleeve holder (20a) is similar to the front sleeve holder (20), is mounted in the cavity (100) of the housing (10) near the rear (12) and has a tube (21) and a mount (22).

The tube (21) of the rear sleeve holder (20a) has an inside end, an outside end and a mounting hole (210) defined axially through the tube (21). The outside end is opposite to the inside end.

The mount (22) of the rear sleeve holder (20a) is formed on and protrudes radially from the inside end of the tube (21), abuts the limiting protrusions (151), abuts the mount (22) of the front sleeve holder (20) and may have two opposite side edges (221), two opposite resilient hooks (23), a first engaging portion (222) and a second engaging portion (224). The resilient hooks (23) are formed on and protrude longitudinally outwards from the mount (22) and may hook on a corresponding optical fiber plug connector. The first engaging portion (222) is formed on one side edge (221), abuts one limiting protrusion (151), is engaged with the second engaging portion (222) of the mount of the front sleeve holder (20) and may have an engaging notch (223) defined in the first engaging portion (222) and engaged with the engaging protrusion of the mount (22) of the front sleeve holder (20). The second engaging portion (224) is formed on the other side edge (221), abuts the other limiting protrusion (151), is engaged with the first engaging portion (222) of the mount (22) of the front sleeve holder (20) and may be an engaging protrusion protruding longitudinally out from the side edge (221) and engaged with the engaging notch (223) of the mount (22) of the front sleeve holder (20).

The sleeve (30) is hollow, may be made of ceramic, is mounted in the mounting holes (210) of the tubes (21) of the front and rear sleeve holders (20, 20a) and allows light from an optical fiber plug connector to pass through the sleeve (30).

The detachable positioning member (50) may be made of metal, is mounted detachably on the housing (10) and has a link (51), two wings (52) and two stoppers (53).

The link (51) may be a plate, is mounted and exposed on the top (13) of the housing (10), may be mounted in the top indentation (17) and has two ends.

The wings (52) may be plates, are resilient, are formed respectively on and protrude downwards from the ends of the link (51), are mounted respectively and exposed on the sides (14) of the housing (10) and may be mounted respectively in the side indentations (18). Each wing (52) may have a front edge, a rear edge, a hooking opening (520) and a fastening tab (54). The hooking opening (52) is defined through the wing (52) and hooks on the at least one hooking element (181) in one side indentation (18). The fastening tab (54) is formed on and protrudes from the wing (52) towards one protruding block (15) of the housing (10). When the optical fiber connector adapter is mounted on a panel, each fastening tab (54) cooperates with a corresponding protruding block (15) to clamp the panel so that the optical fiber connector adapter is mounted securely on the panel.

The stoppers (53) may be plates, are formed respectively on and protrude perpendicularly and transversely from the rear edges of the wings (52), extend inwards towards each other, are mounted respectively in the positioning slots (16) of the housing (10) and abut the mounts (22) of the front and rear sleeve holders (20, 20a) so that the mounts (22) are clamped between the stoppers (53) and the limiting protrusions (151) of the housing (10). In the preferred embodiment, each stopper (53) abuts one of the first and second engaging portions (222, 224) of the front sleeve holder (20) and also abuts one of the first and second engaging portions (222, 224) of the rear sleeve holder (20a) so that each of the first and second engaging portions (222, 224) of each of the first and second sleeve holders (20, 20a) are clamped by one of the stoppers (53) and one of the limiting protrusions (151).

The limiting protrusions (151) of the housing (10) and the stoppers (53) of the detachable positioning member (50) cooperate to clamp the mounts (22) of the front and rear sleeve holders (20, 20a) to prevent the optical fiber connector adapter from inadvertently disassembling. Furthermore, the plated link (51) and wings (52) of the detachable positioning member (50) have large surface areas exposed out of the housing (10) to facilitate detaching the detachable positioning member (50) when the sleeve (10) is damaged and needs replacement. Therefore, the detachable positioning member (50) advantages reworking the optical fiber connector adapter. Moreover, the optical fiber connector adapter fabricated without any ultrasound welding processes saves energy and time so has a low manufacturing cost and a high production rate.

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An optical fiber connector adapter comprising:
   a housing having a front, a rear, a top, a bottom and two opposite sides and further having
   a cavity defined in the housing through the front and the rear and having an inner surface;

two limiting protrusions formed and protruding transversely from the inner surface of the cavity; and
two positioning slots defined in the top respectively adjacent to the sides;
a front sleeve housing mounted in the cavity of the housing and having a tube having an inside end, an outside end and a mounting hole defined through the front sleeve housing; and
a mount formed on and protruding radially from the inside end of the tube and abutting the limiting protrusions;
a rear sleeve housing mounted in the cavity of the housing and having a tube having an inside end, an outside end and a mounting hole defined through the front sleeve housing; and
a mount formed on and protruding radially from the inside end of the tube of the rear sleeve housing, abutting the limiting protrusions and abutting the mount of the front sleeve holder;
a sleeve being hollow and mounted in the mounting holes of the tubes of the front and rear sleeve holders; and
a detachable positioning member mounted detachably on the housing and having
a link being a plate, mounted and exposed on the top of the housing and having two ends;
two wings being plates, formed respectively on and protruding downwards from the ends of the link and mounted respectively and exposed on the sides of the housing; and
two stoppers being plates, formed respectively on and protruding from the wings, mounted respectively in the positioning slots of the housing and abutting the mounts of the front and rear sleeve holders so that the mounts are clamped between the stoppers and the limiting protrusions of the housing.

2. The optical fiber connector adapter as claimed in claim 1, wherein the stoppers of the detachable positioning member respectively protrude perpendicularly and transversely from the wings and extend inwards towards each other.

3. The optical fiber connector adapter as claimed in claim 2, wherein the wings of the detachable positioning member are resilient.

4. The optical fiber connector adapter as claimed in claim 3, wherein
the mount of the front sleeve holder has
two opposite sides edge;
a first engaging portion formed on one side edge and abutting one limiting protrusion; and
a second engaging portion formed on the other side edge and abutting the other limiting protrusion;
the mount of the rear sleeve holder has two opposite side edges;
a first engaging portion formed on one side edge of the mount of the rear sleeve holder, abutting one limiting protrusion and engaged with the second engaging portion of the mount of the front sleeve holder; and
a second engaging portion formed on the other side edge of the mount of the rear sleeve holder, abutting the other limiting protrusion and engaged with the first engaging portion of the mount of the front sleeve holder; and
each stopper of the detachable positioning member abuts one of the first and second engaging portions of the front sleeve holder and abuts one of the first and second engaging portions of the rear sleeve holder so that each of the first and second engaging portions of each of the first and second sleeve holders are clamped by one of the stoppers and one of the limiting protrusions.

5. The optical fiber connector adapter as claimed in claim 4, wherein
in the mount of the front sleeve holder, the first engaging portion has an engaging notch defined in the first engaging portion, and the second engaging portion is an engaging protrusion protruding longitudinally out from the mount of the front sleeve holder; and
in the mount of the rear sleeve holder, the first engaging portion has an engaging notch defined in the first engaging portion and engaged with the engaging protrusion of the mount of the front sleeve holder, and the second engaging portion is an engaging protrusion protruding longitudinally out from the mount of the rear sleeve holder and engaged with the engaging notch of the mount of the front sleeve holder.

6. The optical fiber connector adapter as claimed in claim 5, wherein
the mount of the front sleeve holder further has two resilient hooks formed on and protruding longitudinally outwards from the mount; and
the mount of the rear sleeve holder further has two resilient hook formed on and protruding longitudinally outwards from the mount.

7. The optical fiber connector adapter as claimed in claim 6, wherein the housing further has a top indentation defined in the top and accommodating the link of the detachable positioning member.

8. The optical fiber connector adapter as claimed in claim 7, wherein the housing further has two side indentations defined respectively in the sides, communicating with the top indentation and respectively accommodating the wings of the detachable positioning member.

9. The optical fiber connector adapter as claimed in claim 8, wherein each side indentation has an inner surface and at least one hooking element formed on the inner surface; and
each wing of the detachable positioning member has a hooking opening defined through the wing and hooking on the at least one hooking element in on side indentation.

10. The optical fiber connector adapter as claimed in claim 9, wherein
the housing further has two protruding blocks formed respectively on and protruding transversely outwards from the sides; and
each wing of the detachable positioning member further has a fastening tab formed on and protruding from the wing towards one protruding block of the housing.

11. The optical fiber connector adapter as claimed in claim 10, wherein the rear sleeve holder is similar to the front sleeve holder.

12. The optical fiber connector adapter as claimed in claim 11, wherein the detachable positioning member is made of metal.

13. The optical fiber connector adapter as claimed in claim 12, wherein the sleeve is made of ceramic.

14. The optical fiber connector adapter as claimed in claim 13 being compatible with the subscriber connector standard.

* * * * *